United States Patent
Van Loon et al.

(10) Patent No.: US 7,588,706 B2
(45) Date of Patent: Sep. 15, 2009

(54) MULTI-LAYER FILMS WITH IMPROVED PROPERTIES

(75) Inventors: Achiel Jos Van Loon, Schoten (BE); Marc D. Tierens, Metse (BE); Dirk J. Permentier, Meerdeke (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 958 days.

(21) Appl. No.: 11/015,602

(22) Filed: Dec. 16, 2004

(65) Prior Publication Data

US 2006/0131778 A1 Jun. 22, 2006

(51) Int. Cl.
B32B 27/00 (2006.01)
(52) U.S. Cl. .................. 264/173.14; 525/240; 428/516
(58) Field of Classification Search ............ 264/173.14; 428/35.2, 515, 516, 523, 500, 411.1, 34.1, 428/34.8, 34.9, 35.4, 35.7, 36.6, 36.7, 36.9, 428/36.91; 525/240
See application file for complete search history.

(56) References Cited

U.S. PATENT DOCUMENTS

| | | | |
|---|---|---|---|
| 5,017,714 A | 5/1991 | Welborn, Jr. | |
| 5,055,438 A | 10/1991 | Canich | |
| 5,096,867 A | 3/1992 | Canich | |
| 5,153,157 A | 10/1992 | Hlatky et al. | |
| 5,198,401 A | 3/1993 | Turner et al. | |
| 5,240,894 A | 8/1993 | Burkhardt et al. | |
| 5,264,405 A | 11/1993 | Canich | |
| 5,324,800 A | 6/1994 | Welborn, Jr. et al. | |
| 5,507,475 A | 4/1996 | Seel et al. | |
| 5,530,065 A | 6/1996 | Farley et al. | |
| 6,094,889 A | 8/2000 | Van Loon et al. | 53/450 |
| 6,255,426 B1 | 7/2001 | Lue et al. | 526/348 |
| 6,423,420 B1 | 7/2002 | Brant et al. | 428/516 |
| 6,753,390 B2 | 6/2004 | Ehrman et al. | 526/113 |
| 6,773,818 B2 * | 8/2004 | Cretekos et al. | 428/461 |
| 6,953,828 B2 * | 10/2005 | Dharmarajan et al. | 525/191 |
| 2002/0006482 A1 * | 1/2002 | Falla et al. | 428/35.2 |

FOREIGN PATENT DOCUMENTS

| | | |
|---|---|---|
| CA | 1268753 | 11/1986 |
| EP | 277003 | 8/1988 |
| EP | 277004 | 8/1988 |
| EP | 129368 | 7/1989 |
| EP | 426637 | 4/1995 |
| EP | 520732 | 12/1995 |
| EP | 570982 | 1/1997 |
| EP | 495375 | 2/1997 |
| EP | 500944 | 10/1998 |
| EP | 573403 | 11/1998 |
| EP | 0963409 | 4/2003 |
| EP | 1238796 | 9/2004 |
| EP | 1332868 | 4/2005 |
| WO | WO 91/09882 | 7/1991 |
| WO | WO 92/00333 | 1/1992 |
| WO | WO 93/03093 | 2/1993 |
| WO | WO 94/03506 | 2/1994 |
| WO | WO 94/26816 | 11/1994 |
| WO | 97/28960 | 8/1997 |
| WO | 98/37141 | 8/1998 |
| WO | 98/29249 | 9/1998 |
| WO | 00/29211 | 5/2000 |
| WO | 03000790 | 1/2003 |

OTHER PUBLICATIONS

P. Mesnil et al., "Seal Through Contamination Performance of Metallocene Plastomers", 2000 TAPPI Polymers, Laminations & Coatings Conference Aug. 2000 Chicago, Illinois.
J. Cazes , "Liquid Chromatography of Polymers and Related Materials III", Marcel Dekker, Inc, pp. 207, 1981.

* cited by examiner

*Primary Examiner*—Steven P Griffin
*Assistant Examiner*—Yana Belyaev

(57) ABSTRACT

A method of improving hot tack and/or seal strength in a multi-layer film by selecting a first PE comprising at least one of mPE, LDPE or LLDPE to form a first layer and selecting a blend comprising a mPE and a PP to form an outer layer; and coextruding the first PE and the blend to form the multi-layer film comprising the first layer and the outer layer; wherein the inner layer comprises at least one component having a final melting point at least about 15° C. higher than a final melting point of at least one component of the first layer, wherein the multi-layer film has a maximum hot tack at least about 25% greater than a similar multi-layer film with 0-weight % of the PP in the inner layer.

27 Claims, 4 Drawing Sheets

MULTI-LAYER FILMS WITH IMPROVED PROPERTIES

FIELD OF THE INVENTION

This invention relates to multi-layer films having improved properties. More specifically, this invention relates to a method of selecting polyethylenes (PE) and polypropylenes (PP) for coextrusion to form multi-layer films having improved sealing properties and methods of preparing the multi-layer films having improved sealing properties.

DESCRIPTION OF RELATED ART

The manufacture of coextruded blown film and cast film and the equipment for making it are well known. As the film is drawn from an annular or flat die in molten form, the film solidifies and crystallizes upon cooling. Multi-layer films have been made in which at least one surface or outer layer is made to facilitate heat-sealing. A core film layer may be used to provide the main physical properties of the film such as impact resistance, stretchability, or combinations thereof. Layers between the surface layer and core layer, referred to as intermediate layers in this context, may facilitate desired properties such as, but not limited to, the mutual adhesion of the layers and/or may impart barrier properties against the transmission of moisture, carbon dioxide, oxygen, other gases and the like.

PE has traditionally been used as a layer in polyolefin films and packaging because of its desirable properties such as moisture impermeability, good sealing behavior, good optical properties and good organoleptics. Typically, PE has been coextruded, laminated or otherwise bonded to other polyolefins and other polymers such as polyamides and poly(ethyl vinyl alcohol) which have better strength than PE, yet do not seal as well as PE. For example, in a typical multi-layer film, a PP layer, especially a mono- or biaxially-oriented PP (OPP) layer, provides high clarity, high melting, high barrier properties, combined with high stiffness while a PE layer provides extra body to the film and allows a low sealing temperature, meaning higher packaging speeds. However, PP and PE have very limited compatibility and direct sealing of PE onto PP film is not commonly done. When a layer of PE is combined with a layer of PP, extra primer may be needed. For example, extra primer is used when PE, such as low density PE, is coated onto PP films. In addition tie layers may also be necessary. Coextrudable tie layers such as ethylene vinyl acetate copolymers, typically having more than 8 weight % vinyl acetate, have been extruded between PP and PE to enhance adhesion between the PE and the PP. Another solution to the compatibility problem has been to blend PP into the PE. Adhesion and compatibility with PP is significantly enhanced by using metallocene PE compared to the use of a traditional PE, i.e., a Ziegler-Natta PE.

There is a trend by film manufacturers to down gauge film thickness, which requires increased stiffness of the polymer components. The stiffer polymer components are preferably used in a core layer rather than a sealing layer since the higher crystallinity of the stiffer polymer components would require a higher sealing temperature with a concomitant reduction in packaging speed. High density PE (HDPE) competes with PP, with HDPE having increased compatibility but less stiffness than PP. There still exists a need for methods to improve sealing properties, such as seal strength and hot tack, of multi-layer films and to prepare such multi-layer films.

When a film has a significantly higher hot tack strength relative to another film, the packaging rate of the film with the higher hot tack strength can be more easily increased to a higher rate. A film with increased seal strength provides increased packaging integrity to provide a stronger pack as evidenced by fewer leaking packages.

The present invention provides a method for selecting PE and PP for coextrusion to form multi-layer films having improved sealing properties, as measured by hot tack and seal strength, for use in the flexible packaging industry.

SUMMARY OF THE INVENTION

One embodiment according to the present invention provides a method of improving hot tack and/or seal strength in a multi-layer film by selecting a first PE comprising at least one of metallocene PE (mPE), low density PE (LDPE) or linear low density PE (LLDPE) to form a first outer layer; selecting a blend comprising from about 95 weight % to about 5 weight % of a mPE and from about 5 weight % to about 95 weight % of a PP to form an inner layer, wherein the weight % is based on the total weight of the mPE and the PP in the blend; selecting a second PE comprising at least one of mPE, LDPE or LLDPE to form a second outer layer; and coextruding the first PE, the blend and the second PE to form the multi-layer film comprising a first outer layer, an inner layer, a second outer layer, respectively; wherein the inner layer has a component having a final melting point at least about 15° C. higher than a final melting point of at least one component of at least one of the first outer layer or the second outer layer; wherein the multi-layer film has a maximum hot tack at least about 25% greater than a multi-layer film with 0-weight % of the PP in the inner layer. In one embodiment, the first outer layer and second outer layer have substantially no PP, i.e, less than about 10 weight % PP, preferably less than about 5 weight % PP, more preferably less than about 1 weight % PP and yet more preferably 0-weight % PP. In another embodiment, the multi-layer film has a maximum hot tack from about 25% to about 120% greater than a multi-layer film with 0-weight % PP in the inner layer.

One embodiment according to the present invention provides a method of improving hot tack and/or seal strength in a multi-layer film by selecting a first PE comprising at least one of mPE, LDPE or LLDPE to form a first layer and selecting a blend comprising from about 95 weight % to about 5 weight % of a mPE and from about 5 weight % to about 95 weight % of a PP to form a blend layer, wherein the weight % is based on the total weight of the mPE and the PP in the blend; and coextruding the first PE and the blend to form the multi-layer film comprising the first layer and the blend layer; wherein the blend layer comprises at least one component having a final melting point at least about 15° C. higher than a final melting point of at least one component of the first layer, wherein the multi-layer film has a maximum hot tack at least about 25% greater than a multi-layer film with 0-weight % of the PP in the blend layer; and wherein the first layer has substantially no PP, i.e, less than about 10 weight % PP, preferably less than about 5 weight % PP, more preferably less than about 1 weight % PP and yet more preferably 0-weight % PP. In another embodiment, the multi-layer film has a maximum hot tack from about 25% to about 120% greater than a multi-layer film with 0-weight % PP in the inner layer.

In one embodiment according to the present invention, the method provides a blend layer comprising from about 20 weight % to about 95 weight % PP; preferably from about 40 weight % to about 80 weight % PP; and more preferably from about 60 weight % to about 80 weight % PP, wherein the film has a first layer comprising at least one of mPE, LDPE or LLDPE. In one embodiment according to the present invention, the method provides an inner layer comprising from about 40 weight % to about 95 weight % PP; preferably from about 40 weight % to about 80 weight % PP; and more preferably from about 60 weight % to about 80 weight % PP wherein the film comprises an inner layer and a first outer layer and a second outer layer. The first outer layer and the second outer layer may be the same or different materials comprising at least one of mPE, LDPE or LLDPE.

In one embodiment according to the present invention, the method provides an inner layer having at least one component having a final melting point at least about 15° C. higher than a final melting point of at least one component of the first outer layer or the second outer layer, preferably at least about 20° C. higher than a final melting point of at least one component of the first outer layer or the second outer layer, and more preferably at least about 25° C. higher than a final melting point of at least one component of the first outer layer or the second outer layer, and yet more preferably at least about 30° C. higher than a final melting point of at least one component of the first outer layer or the second outer layer.

In one embodiment according to the present invention, the method provides that the first outer layer and the second outer layer are not the same to provide a multi-layer film with an ABC structure in which A, B, and C are different.

In one embodiment according to the present invention, the method provides that the first outer layer and the second outer layer are the same to provide a multi-layer film with an ABA structure in which A and B are different.

In one embodiment according to the present invention, the method provides that the plateau seal strength of the multi-layer film is greater than the seal strength of a similar multi-layer film with 0-weight % PP in the inner layer or the blend layer.

One method according to the present invention provides a method of improving hot tack in a multi-layer film selecting a first PE comprising at least one of mPE, LDPE or LLDPE to form a first layer; selecting a blend comprising from about 95 weight % to about 5 weight % of a mPE and from about 5 weight % to about 95 weight % of a PP to form a blend layer, wherein the weight % is based on the total weight of the mPE and the PP in the blend; and coextruding the first layer and the blend layer to form the multi-layer film; wherein the blend layer has a component having a final melting point at least about 15° C. higher than a final melting point of at least one component of the first layer; wherein the multi-layer film has a maximum hot tack at least about 25% greater than a multi-layer film without the PP in the blend layer; and wherein the first layer has substantially no PP. In another embodiment the multi-layer film has a maximum hot tack from about 25% to about 120% greater than a multi-layer film without the PP in the blend layer; and wherein the first layer has substantially no PP.

One method according to the present invention provides a method of improving hot tack in a multi-layer film, the method comprising selecting a first PE comprising at least one of mPE, LDPE or LLDPE to form a first outer layer; selecting a blend comprising from about 95 weight % to about 5 weight % of a mPE and from about 5 weight % to about 95 weight % of a PP to form an inner layer, wherein the weight % is based on the total weight of the mPE and the PP in the blend; and selecting a second PE comprising at least one of mPE, LDPE or LLDPE to form a second outer layer; and coextruding the first PE, the blend and the second PE to form the multi-layer film comprising the first outer layer, the inner layer and the second outer layer, respectively; wherein the inner layer has a component having a final melting point at least about 15° C. higher than a final melting point of at least one component of the first outer layer or the second outer layer; wherein the multi-layer film has a maximum hot tack at least about 25% greater than a multi-layer film without the PP in the inner layer; and wherein the first outer layer and second outer layer have substantially no PP. In another embodiment the multi-layer film has a maximum hot tack from about 25% to about 120% greater than a multi-layer film without the PP in the inner layer; and wherein the first outer layer and second outer layer have substantially no PP.

These and other features, aspects and advantages of the present invention will become better understood with reference to the following description and appended claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

The present invention provides a method for improving sealing properties, such ad hot tack and seal strength, in multi-layer films comprising PEs and/or PPs and methods for preparing such multi-layer films. The improved sealing properties of the multi-layer films permit higher line speeds and productivity rates on equipment, for example Form-Fill-Seal (FFS) packaging lines, resulting in shorter converting times. Improved sealing properties generally means high values for hot tack and seal strength, preferably over a wide temperature range, and preferentially also starting to seal at a lower temperature, i.e., a lower seal initiation temperature. Generally, the higher the plateau seal strength and maximum hot tack value and the broader the temperature operating window, the better the multi-layer film.

Applicants have discovered methods of selecting and producing PE, PP and/or blends thereof that provide unexpected improvements in hot tack and seal strength in coextruded multi-layer films having two or more layers. Although the specific embodiments of the methods described hereafter are described with respect to three-layer, coextruded films, one of ordinary skill in the art recognizes that films with more than three-layers are also encompassed within the scope of the present invention. Additionally, two-layer coextruded films are also contemplated as embodiments according to the present invention. These and other similar multi-layer composites can also be obtained by adhesive and heat lamination, coating and combinations thereof.

Figure 1:
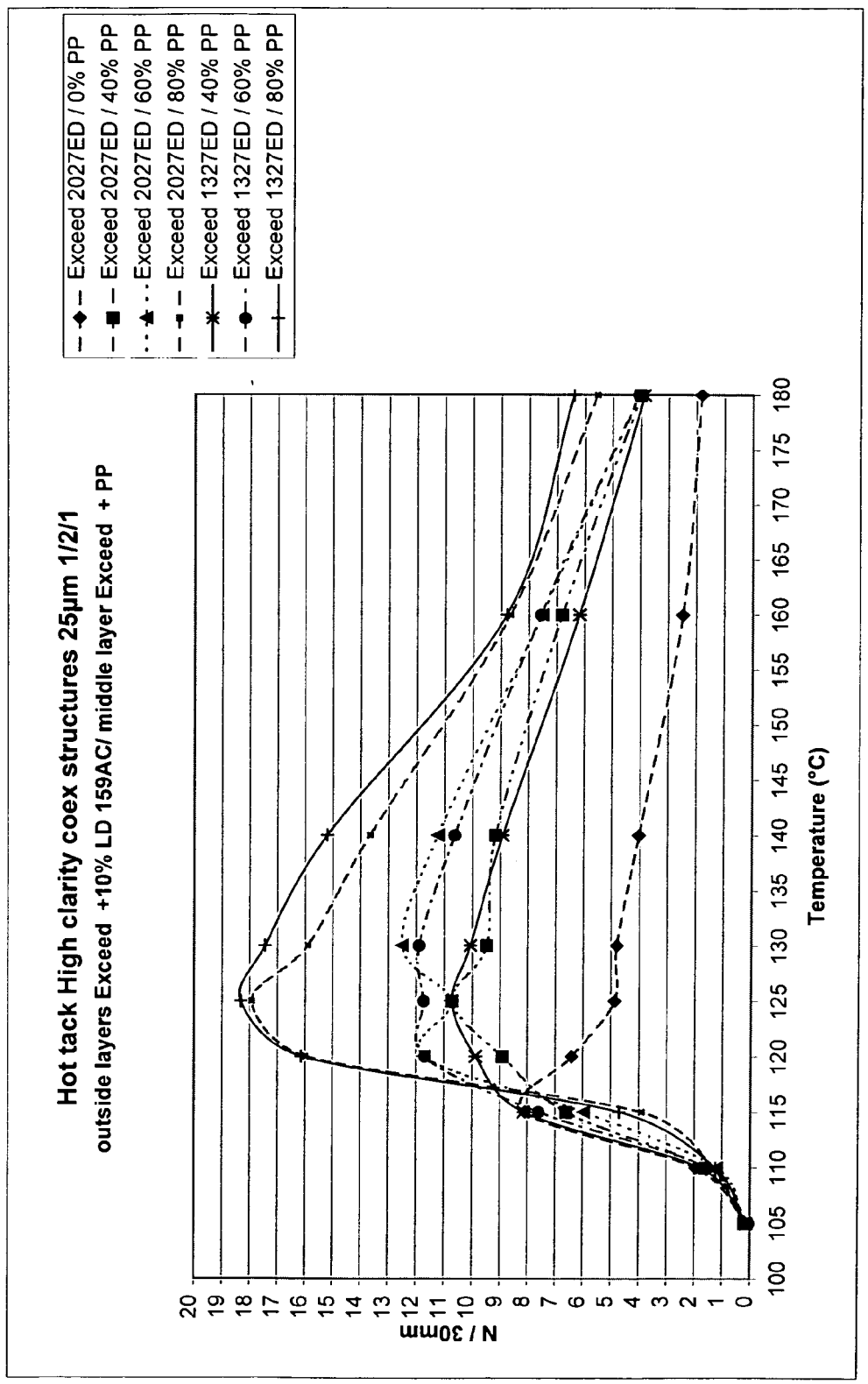
FIG. 1 shows the hot tack values for two series of multi-layer films having a different PE in the first and second outer layers and PP in the inner layer and compares these films to a film without PP in the inner layer.

One embodiment according to the present invention is a method of increasing hot tack in a multi-layer film by selecting a first PE comprising at least one of mPE, LDPE or LLDPE to form a first outer layer; selecting a blend comprising from about 95 weight % to about 5 weight % of a mPE and from about 5 weight % to about 95 weight % of a PP to form an inner layer, wherein the weight % is based on the total weight of the mPE and the PP in the blend; and selecting a second PE comprising at least one of mPE, LDPE or LLDPE to form a second outer layer; and coextruding the first PE, the blend and the second PE to form the multi-layer film comprising the first outer layer, the inner layer, and the second outer layer; wherein the inner layer has at least one component having a final melting point at least about 15° C. higher than a final melting point of at least one component of the first outer layer or the second outer layer; wherein the multi-layer film has a maximum hot tack at least about 25% greater than a multi-layer film with 0-weight % of the PP in the inner layer. In one embodiment, the multi-layer film has a maximum hot tack from about 25% to about 120% greater than a similar multi-layer film with 0-weight % of the PP in the inner layer. In another embodiment the inner layer has from about 60 weight % to about 95 weight % of the PP and preferably from about 80 weight % to about 95 weight % of the PP. In the embodiments having a first outer layer and a second outer layer wherein either the first or second outer layers may be a sealing layer, the first outer layer and the second outer layer may be the same or different compositions. Examples are shown in FIG. 1 for a multi-layer film having a 1/2/1 layer ratio with a 25 micron thickness and the outer layers comprising EXCEED™ 2027ED PE plus LD 159AC and the inner layer comprising EXCEED™ 2027ED PP plus PP 4352F1. In comparative films in which the PP content of the inner layer is 0-weight %, the PP is replaced with an equal weight of PE such that the thickness and/or weight of the inner layer of the comparative film is the same as a layer containing PP.

For purposes of this application, the terms "first outer layer" and "second outer layer" refer to a relative position of these layers with respect to the inner layer. The inner layer is between the first outer layer and the second outer layer. Either or both of the first outer layer and the second outer layer may be in contact with the inner layer. Alternatively, there may be one or more intermediate film layers between the inner layer and either or both the first outer layer and the second outer layer. Alternatively, in films with more than three layers, one or both of the first and second outer layers may in an interior position relative to additional film layers.

In one embodiment according to the present invention, the method provides for increasing the maximum hot tack force from about 25% to about 120% greater than the maximum hot tack of a similar multi-layer film having 0-weight % PP in the inner layer; preferably from about 50% to about 120% greater than the hot tack of a similar multi-layer film having 0-weight % PP in the inner layer. In one embodiment according to the present invention, the method provides for increasing the maximum hot tack at least about 25% greater than the maximum hot tack of a similar multi-layer film having 0-weight % PP in the inner layer; preferably at least about 50% greater than the maximum hot tack of a similar multi-layer film having 0-weight % PP in the inner layer, and more preferably at least about 120% greater than the maximum hot tack of a similar multi-layer film having 0-weight % PP in the inner layer. FIG. 1 shows the hot tack data comparing a reference sample without PP in the inner layer to two series of films in which the films differ with respect to the PE used in the first and second outer layers. The maximum hot tack is the peak force obtained from a graph of force versus temperature measured for a film, as exemplified in FIG. 1 for the 20% EXCEED: 80% PP curve having a maximum hot tack value of about 18.3 N/30 mm.

In one embodiment according to the present invention, the method provides for increasing the hot tack operating window at 6 Newtons/30 millimeter (N/30 mm) from about 113° C. to about 120° C. for the multi-layer film without PP to from about 115° C. to about 165° C. for a similar film with 40 weight % PP; from about 115° C. to about 168° C. for a similar film with 60 weight % PP; and from about 116° C. to about 177° C. for a similar film with about 80 weight % PP. In another embodiment the multi-layer film has a hot tack greater than or equal to about 5 N/30 mm between about 117° C. and about 167° C., preferably a hot tack greater than or equal to about 9 N/30 mm between about 121° C. to about 139° C., and more preferably a hot tack greater than or equal to about 17 N/30 mm between about 120° C. to about 133° C. In another embodiment the multi-layer film has a maximum hot tack greater than or equal to about 5 N/30 mm, preferably greater than or equal to about 9 N/30 mm, and more preferably greater than or equal to about 17 N/30 mm between about 115° C. to about 170° C. FIG. 1 provides this information for a series of multi-layer films, having the same thickness, prepared according to one embodiment of the present invention.

In one embodiment according to the present invention, the method provides for selecting a first PE comprising at least one of mPE, LDPE or LLDPE to form a first outer layer; selecting a blend comprising from about 95 weight % to about 5 weight % of a m-PE and from about 5 weight % to about 95 weight % of a PP to form an inner layer, wherein the weight % is based on the total weight of the PE and the PP in the blend; and selecting a second PE comprising at least one of mPE, LDPE or LLDPE to form a second outer layer; and coextruding the first PE, the blend, and the second PE to form the multi-layer film comprising the first outer layer, the inner layer and the second outer layer, respectively; wherein at least one component of the inner layer has a final melting point at least about 15° C. higher than a final melting point of at least one component of the first outer layer or the second outer layer. Preferably, at least one component of the inner layer has a final melting point at least about 15° C. higher than a final melting point of at least one component of the first outer layer or the second outer layer, more preferably at least about 20° C. higher, even more preferably at least about 25° C. higher, and yet more preferably at least about 30° C. higher.

One embodiment according to the present invention is a method of increasing seal strength in a multi-layer film by selecting a first PE comprising at least one of mPE, LDPE or LLDPE to form a first outer layer; selecting a blend comprising from about 95 weight % to about 5 weight % of a mPE and from about 5 weight % to about 95 weight % of a PP to form an inner layer; wherein the weight % is based on the total weight of the mPE and the PP in the blend, and selecting a second PE comprising at least one of mPE, LDPE or LLDPE to form a second outer layer; and coextruding the first PE, the blend and the second PE to form the multi-layer film comprising the first outer layer, an inner layer, and the second outer layer, respectively; wherein the inner layer has a final melting point at least about 15° C. higher than a final melting point of the first outer layer or the second outer layer; wherein the multi-layer film has a seal strength greater than a multi-layer film with 0-weight % of the PP in the inner layer. In one embodiment the first outer layer and second outer layer comprise PP with either or both of the first and second outer layers having less than about 10 weight % PP, preferably less than about 5 weight % PP, more preferably less than about 1 weight % PP and yet more preferably 0-weight % PP. In another embodiment, the multi-layer film has a maximum hot tack from about 25% to about 120% greater than a multi-layer film with 0-weight % PP in the inner layer. In another embodiment, the multi-layer film has a maximum hot tack at least about 25% greater than a multi-layer film with 0-weight % PP in the inner layer. This is exemplified by graphical representation in FIGS. 1 and 2 for multi-layer films having a 1/2/1 layer ratio with a 25 micron thickness and the outer layers comprising EXCEED™ 2027ED PE plus LD 159AC and the inner layer comprising EXCEED™ 2027ED PE plus PP 4352F1.

Figure 2:
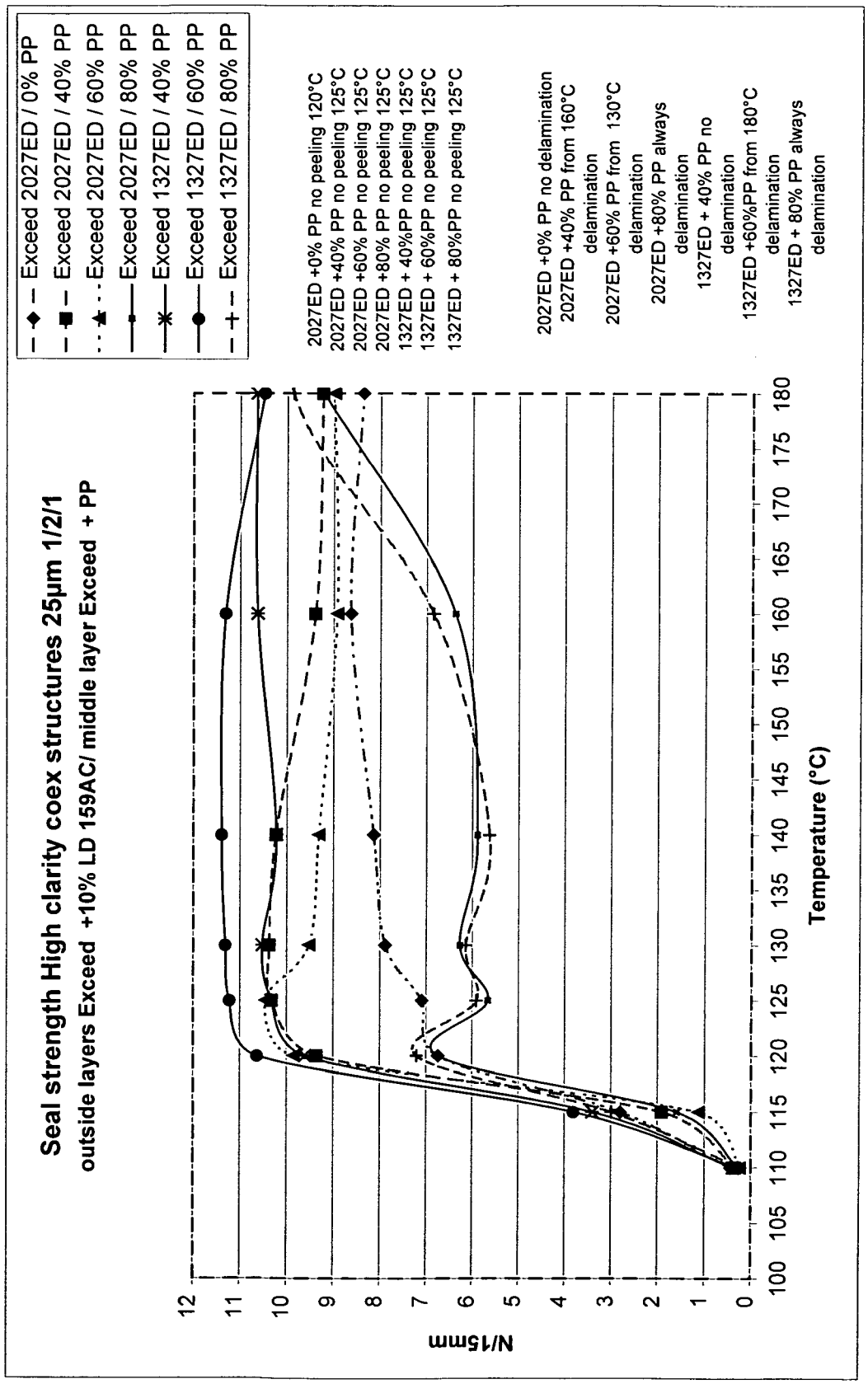
FIG. 2 shows the seal strength values for two series of multi-layer films having a different PE in the first and second outer layers and PP in the inner layer and compares these films to a film without PP in the inner layer.

In one embodiment according to the present invention, the method provides a plateau seal strength greater than about 9 Newtons/15 millimeters (N/15 mm) for the 25 micron multi-layer films, shown in FIG. 2, having from about 40 weight % PP to about 60 weight % PP in the inner layer. In contrast, a similar film having 0-weight % PP in the inner layer had a plateau seal strength of less than 9 N/15 mm. Additionally, the 25 micron films having 40 weight % PP to about 60 weight % PP in the inner layer have a seal strength plateau at about 125° C., but the film with 0 weight % PP in the inner layer had a seal strength plateau at about 160° C. Also, as shown in FIG. 2, the multi-layer film having 80 weight % PP in the inner layer had seal strength values less than or equal to the similar film having 0 weight % PP at temperatures below about 165° C. In one embodiment the plateau seal strength is about 15% larger, preferably about 20% larger and more preferably about 25% larger than the plateau seal strength for a similar film without PP in the inner or blend layer.

One embodiment according to the present invention provides a method of improving hot tack in a multi-layer film selecting a first PE comprising at least one of mPE, LDPE or LLDPE to form a first layer; selecting a blend comprising from about 95 weight % to about 5 weight % of a mPE and from about 5 weight % to about 95 weight % of a PP to form a blend layer, wherein the weight % is based on the total weight of the mPE and the PP in the blend; and coextruding the first layer and the blend layer to form the multi-layer film; wherein the blend layer has a component having a final melting point at least about 15° C. higher than a final melting point of at least one component of the first layer; wherein the multi-layer film has a maximum hot tack at least about 25% greater than a multi-layer film with 0-weight % of the PP in the blend layer; and wherein the first layer has substantially no PP, i.e., less than about 10 weight % PP, preferably less than about 5 weight % PP, more preferably less than about 1 weight % PP, and yet more preferably 0-weight % PP. In another embodiment the multi-layer film has a maximum hot tack from about 25% to about 120% greater than a multi-layer film without the PP in the inner layer.

One embodiment according to the present invention provides a method of improving hot tack in a multi-layer film, the method comprising selecting a first PE comprising at least one of mPE, LDPE or LLDPE to form a first outer layer; selecting a blend comprising from about 95 weight % to about 5 weight % of a mPE and from about 5 weight % to about 95 weight % of a PP to form an inner layer, wherein the weight % is based on the total weight of the mPe and the PP in the blend; and selecting a second PE comprising at least one of mPE, LDPE or LLDPE to form a second outer layer; and coextruding the first PE, the blend and the second PE to form the multi-layer film comprising the first outer layer, the inner layer and the second outer layer, respectively; wherein the inner layer has a component having a final melting point at least about 15° C. higher than a final melting point of at least one component of the first outer layer or the second outer layer; wherein the multi-layer film has a maximum hot tack at least about 25% % greater than a multi-layer film without the PP in the inner layer; and wherein the first outer layer and second outer layer have substantially no PP. In another embodiment the multi-layer film has a maximum hot tack from about 25% to about 120% greater than a multi-layer film without the PP in the inner layer.

The $C_3$ to $C_{20}$ olefin comonomers for the PE and $C_4$ to $C_{20}$ olefin comonomers for the PP copolymers described above may be any polymerizable olefin monomer and are preferably a linear, branched or cyclic olefin, even more preferably an α-olefin. Examples of suitable olefins include propylene, butene, isobutylene, pentene, isopentene, cyclopentene, hexene, isohexene, cyclohexene, heptene, isoheptene, cycloheptene, octene, isooctene, cyclooctene, nonene, cyclononene, decene, isodecene, dodecene, isodecene, 4-methyl-pentene-1, 3-methyl-pentene-1, 3,5,5-trimethyl hexene-1. Suitable comonomers also include dienes, trienes, and styrenic monomers. Preferred examples include styrene, alpha-methyl styrene, para-alkyl styrene (such as para-methyl styrene), hexadiene, norbornene, vinyl norbornene, ethylidene norbornene, butadiene, isoprene, heptadiene, octadiene, and cyclopentadiene.

Preferred comonomers for the copolymer of ethylene are propylene, butene, hexene and/or octene.

The PE or PP co-polymers described above may also contain two, three, four or more monomers, which may be one or more of the $C_2$ to $C_{20}$ olefins described above, any combination of one or more of $C_4$ to $C_{30}$ linear, cyclic or branched dienes or trienes and any styrenic monomers such as styrene, alpha-methyl styrene, or para-methyl styrene. Preferred examples include butadiene, pentadiene, cyclopentadiene, hexadiene, cyclohexadiene, heptadiene, octadiene, nonadiene, norbornene, vinyl norbornene, ethylidene norbornene, isoprene and heptadiene.

The PE polymers and copolymers disclosed in U.S. Pat. No. 6,255,426 B1, which is fully incorporated by reference, may be used. This includes a polymer of an ethylene and at least one alpha olefin having at least 5 carbon atoms obtainable by a continuous gas phase polymerization using supported catalyst of an activated molecularly discrete catalyst in the substantial absence of an aluminum alkyl based scavenger (e.g., triethylaluminum (TEAL), trimethylaluminum (TMAL), tri-isobutyl aluminum (TIBAL), tri-n-hexylaluminum (TNHAL) and the like), which polymer has a Melt Index (MI) as herein defined of from 0.1 to 15; a Compositional Distribution Breadth Index (CDBI) as defined herein of at least 70%, a density of from 0.910 to 0.930 g/ml; a Haze value as herein defined of less than 20; a Melt Index ratio (MIR) as herein defined of from 35 to 80 ; an averaged Modulus (M) as herein defined of from 20 000 to 60 000 psi (pounds per square inch) (13790 to 41369 N/cm$^2$) and a relation between M and the Dart Impact Strength in g/mil (DIS) complying with the formula:

$$DIS \geq 0.8 \times [100 + e^{(11.71 - 0.000268 \times M + 2.183 \times 10^{-9} \times M^2)}],$$

where "e" represents 2.1783, the base Napierian logarithm, M is the averaged Modulus in psi and DIS is the 26 inch (66 cm) dart impact strength. In a preferred form of the invention, the polyethylenes of the invention are derived from ethylene and up to 15 weight percent of 1-hexene. Preferably, the relation between the Modulus and the Dart Impact Strength complies with the formula:

$$DIS \leq 2.0 \times [100 + e^{(11.71 - 0.00268 \times M + 2.183 \times 10^{-9} \times M^2)}],$$

where "e" is the base Napierian logarithm and M is the averaged Modulus in psi and DIS is the dart impact strength of the polymer in g/mil. Advantageously, the PE polymer or copolymer may have either one or combination of the following features: the density is from 0.915 to 0.927 g/ml, the MI is from 0.3 to 10 and CDBI is at least 75%. Most preferred is a DIS from 120 to 1000 g/mil, especially less than 800 and more than 150 g/mil. Preferably the Mw/Mn by GPC is from 2.5 to 5.5

The PE copolymers described above preferably have a composition distribution breadth index (CDBI) of 50% or more, preferably above 60%, even more preferably above 70%. In one embodiment the CDBI is above 60%, preferably over 80%, even more preferably above 90%, and yet more preferably above 95%. In another particularly preferred embodiment, the PE copolymer has a CDBI between 60 and 85%, even more preferably between 65 and 85%.

In a particularly preferred embodiment the ethylene homopolymer or copolymer has a CDBI of 65 to 85%, a density of 0.915 to 0.96 g/cm$^3$ and a Mw/Mn between 1 and 2.5. In another particularly preferred embodiment the ethylene homopolymer or copolymer has a CDBI of 65 to 85%, a density of 0.890 to 0.96 g/cm$^3$ and a Mw/Mn between 1 and 2.5.

In another preferred embodiment the ethylene homopolymer or copolymer has a density of 0.86 to 0.925 g/cm$^3$ and a CDBI of over 80%, preferably between 80 and 99%. In another preferred embodiment the ethylene homopolymer or copolymer has a density of 0.86 to 0.940 g/cm$^3$ and a CDBI of over 80%, preferably between 80 and 99%.

In another preferred embodiment the blend comprises a homopolymer of ethylene having an Mw/Mn of 3 or less, preferably between 2.5 and 1.

In general, the PE homopolymers and copolymers described above are metallocene PEs (mPEs). The mPE homopolymers or copolymers are typically produced using mono- or bis-cyclopentadienyl transition metal catalysts in combination with an activator such as alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown Tex. under the tradenames EXCEED™ and EXACT™. For more information on the methods and catalysts/activators to produce such mPE homopolymers and copolymers see WO 94/26816; WO 94/03506; EPA 277,003; EPA 277,004; U.S. Pat. No. 5,153,157; U.S. Pat. No. 5,198, 401; U.S. Pat. No. 5,240,894; U.S. Pat. No. 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; U.S. Pat. No. 5,507,475; EPA 426 637; EPA 573 403; EPA 520 732; EPA 495 375; EPA 500 944; EPA 570 982; WO91/09882; WO94/03506 and U.S. Pat. No. 5,055,438.

The PP homopolymer or copolymer preferably has an MFR (melt flow rate) of 1 to 20 as measured according to ASTM D 1238 (230° C., 2.16 kg). In another embodiment the PP homopolymer or copolymer preferably has a CDBI of 50% or more, preferably above 60%, even more preferably above 70%. PPs having a CDBI above 60% are available from ExxonMobil Chemical Company in Baytown, Tex. under the tradename ACHIEVE®.

In another embodiment the PP homopolymer or copolymer can be blended with any of the other propylene homopolymers or copolymers described above. Likewise, the PE homopolymers or copolymers described above for use in the blend may be used alone or may be blended with any of the other PE homopolymers or copolymers described above.

In a preferred embodiment the polymer produced in a high pressure process using a free radical initiator (High Pressure Polymer) is a polymer comprising one or more of $C_2$ to $C_{20}$ olefins and/or polar monomers. Preferred $C_2$ to $C_{20}$ olefins include, but are not limited to, ethylene, propylene, butene, pentene, hexene, octene, 3-methyl-pentene-1, 4-methyl-pentene-1, cyclopentene, cyclohexene, hexadiene, norbornene, isobutene, norbomadiene, pentadiene and 3,5,5-trimethyl hexene-1. Preferred polar monomers include, but are not limited to, acetates (such as vinyl acetate), acrylics (such as acrylic acid, methacrylic acid), and acrylates (such as methacrylate, butylacrylate, methylmethacrylate, and hydroxyethylmethylacrylate). Polar modifiers can also be used in high pressure free radical process, such as alcohols (such as isopropanol) or aldehydes (such as acetaldehyde). Other modifiers known in the art can also be used.

In a preferred embodiment the High Pressure Polymer is low density PE (density 0.910 to less than 0.940 g/cm$^3$, preferably 0.915 to less than 0.935 g/cm$^3$, even more preferably 0.920 to less than 0.935 g/cm$^3$), a copolymer of ethylene and vinyl acetate, a copolymer of ethylene and methyl acrylate, a copolymer of acrylic acid, a copolymer of methylmethacrylate or any other polymers polymerizable by a high-pressure free radical process. The LDPE preferably has up to 20 weight % of comonomer. The ethylene-vinyl acetate (EVA) copolymer and acrylate copolymers preferably have 20-weight % of the polar monomer or less, preferably less than 10-weight %, even more preferably less than 6-weight %. In a preferred embodiment the Melt Index of the LDPE is between 0.2 and 50 g/10 min, preferably between 0.5 and 10 g/10 min, even more preferably between 0.6 and 5 g/10 min, even more preferably between 0.6 and 2.5 g/10 min. The LLDPE can be produced with conventional Ziegler-Natta or chromium-based catalysts or with metallocene catalysts, has a density range of from about 0.916 to about 0.940 g/cm$^3$, is linear and does not contain long chain branching.

Many such High Pressure Polymers are commercially available. For example, LDPE made in a high pressure process is available from ExxonMobil Chemical Company under the trade name ESCORENE®. EVA made in a high pressure process is available from ExxonMobil Chemical Company under the trade name ESCORENE™. EXCEED™ 2027ED is a metallocene PE having a melt index of 2.0 g/10 minutes (ASTM 1238) and a density of 0.927 g/cm$^3$ (ASTM D4703/ D1505). EXCEED™ 1018 series PE are metallocene PEs having a melt index of 1.0 g/10 minutes (ASTM D1238) and a density of 0.918 g/cm$^3$ (ASTM D4703/D1505). LD150 is a LDPE having a melt index of 0.75 g/10 minutes (ASTM D1238) and a density of 0.923 g/cm$^3$ (ASTM D2839/D1505). LD159AC is a LDPE having a melt index of 1.2 g/10 minutes (ASTM D1238) and a density of 0.923 g/cm$^3$ (ASTM D2839/ D1505). PP 4352F1 is a PP homopolymer having a melt flow rate of 2.9 g/10 minutes (ISO 1133). All of these materials are available from ExxonMobil Chemical Company. ENGAGE® polymers available from Dow Elastomers, are also suitable.

The films described herein may vary in thickness depending on the intended application, however films of a thickness from about 10 to about 350 microns are usually suitable. Films intended for packaging are usually from about 10 to about 120 microns thick, preferably from about 10 to about 100 microns, more preferably from about 10 microns to about 50 microns, and yet more preferably from about 10 to about 25 microns. The thickness of the sealing layer is typically about 0.2 to about 50 microns. There may be a sealing layer on both the inner and outer surfaces of the multi-layer film or the sealing layer may be present on only the inner or the outer surface.

Additives such as antiblock, antioxidants, antistats, pigments, fillers, processing aids, UV stabilizers, neutralizers, lubricants, surfactants and/or nucleating agents may also be present in one or more than one layer in the films. Preferred additives include silicon dioxide, clay, titanium dioxide, polydimethylsiloxane, talc, dyes, wax, calcium stearate, carbon black, low molecular weight resins, tackifiers, and glass beads.

In another embodiment the layers may be modified by corona treatment, electron beam irradiation, gamma irradiation, or microwave. In particular, the corona treatment will produce a significant difference in the coefficient of friction of the two surface layers as described in U.S. patent application Ser. No. 08/905,211, which is incorporated by reference herein.

The heat of fusion is used to determine the melting point for an individual crystalline polymer. Thermodynamic heat of fusion data were determined by differential scanning calorimetry (DSC), the procedure for which is as follows. Six to ten mg of a sheet of the polymer pressed at approximately 200° C. to 230° C. are removed with a punch die. This sample is annealed at room temperature for 80 to 100 hours. At the end of the annealing period, the sample is placed in a differential scanning calorimeter (Perkin Elmer 7 Series Thermal Analysis System) and cooled to −50° C. to −70° C. The sample is then heated at a rate of 20° C./minute to a final temperature of 200° C. to 220° C. The thermal output is recorded as the area under the melting peak curve of the sample, which is typically peaked at 30° C. to 175° C., and occurs between the temperatures of 0° C. and 200° C. The thermal output in joules is a measure of the heat of fusion. The melting point is recorded as the temperature of the greatest heat absorption within the range of melting of the sample. The method according to ASTM D 3418 is used.

The final melting point refers to a heat of fusion measurement, except that the value taken as the final melting point is the temperature at which the entire sample becomes molten.

Composition Distribution Breadth Index (CDBI) is measured by the procedure described in PCT publication WO 93/03093, published Feb. 18, 1993. Fractions having a molecular weight (Mw) less than 15,000 were ignored. Melt Index (MI) was measured according to ASTM D 1238. (190° C., 2.16 kg). Density was measured according to ASTM D1505, where the sample was prepared according to ASTM D 1928. Mw and Mn were measured by GPC (Gel Permeation Chromatography) on a Waters 150 gel permeation chromatograph equipped with a differential refractive index (DRI) detector and a Chromatix KMX-6 on line light scattering photometer. The system was used at 135° C. with 1,2,4-trichlorobenzene as the mobile phase. Shodex (Showa Denko America, Inc) polystyrene gel columns 802, 803, 804 and 805 were used. The system was calibrated using polystyrene standards. This technique is discussed in "Liquid Chromatography of Polymers and Related Materials III", J. Cazes editor, Marcel Dekker. 1981, p. 207, which is incorporated herein by reference. No corrections for column spreading were employed; however, data on generally accepted standards, e.g. National Bureau of Standards PE 1484 and anionically produced hydrogenated polyisoprenes (an alternating ethylene-propylene copolymer) demonstrated that such corrections on Mw/Mn (=MWD) were less than 0.05 units. Mw/Mn was calculated from elution times. The numerical analyses were performed using the commercially available Beckman/CIS customized LALLS software in conjunction with the standard Gel Permeation package. Calculations involved in the characterization of polymers by $^{13}$ CNMR follow the work of F. A. Bovey in "Polymer Conformation and Configuration" Academic Press, New York, 1969. For purposes of this invention a homopolymer is defined to have a CDBI of 100%.

The ratio Mw/Mn can be measured directly by gel permeation chromatography techniques, or indirectly, by measuring the ratio of $I_{21}$ to $I_2$ as described in ASTM D-1238-F and ASTM D-1238-E, respectively. $I_2$ is well known in the art as equivalent to Melt Index (MI). $I_{21}$ is also known as high load melt index (HLMI). MI is inversely proportional to the molecular weight of the polymer (Mw).

The ratio of $I_{21}/I_2$ is known as the melt index ratio (MIR) and for the purposes of this patent specification the ratio is also defined to be melt flow ratio (MFR). MIR is generally proportional to the MWD.

Heat seal testing procedure: Seals were made on a Topwave sealing machine. The film was folded between TEFLON® film and inserted between the sealing bars. The sealing bars were closed with a pressure of 0.5 MPa for 0.5 seconds. The film was removed from the Top wave machine and conditioned for a minimum of 40 hours at 23° C.±2° C. and 50% humidity ±5% humidity. Heat seal strength is the strength of a seal measured at least 40 hours after completion of the sealing cycle.

Seal Strength was tested according to the following procedure. After conditioning for a minimum of 40 hours at 23° C.±2° C. and 50% humidity ±5% humidity, the seal strength of a 15 mm wide sample was measured in a Zwick tensile instrument under the following conditions: speed-500 mm/min, load cell-200 N, and clamp distance-50 mm. The film was placed between the clamps and the clamps were moved apart at a speed of 500 mm/min. During the test, the force (N) was recorded as a function of elongation (%). Four test specimens were measured and the average seal strength curve was recorded. The seal strength was the force at which the test specimen failed.

Hot tack is the strength of a heat seal measured at a specified time interval (milliseconds) after completion of the sealing cycle, but before the seal has cooled to ambient temperature and reached maximum strength. Hot tack values for each sample were measured as follows. Cylinder films were collapsed to form two identical layers, one above the other, as set forth in the background material on bag formation. Heated narrow bars, backtaped with adhesive polyethylene terephthlate (PET) tape, one above the upper layer and one below the lower layer, contacted the film at 0.5 Mpa and for 500 milliseconds to create a region of polymer interdiffusion that joined the upper and lower layer across the width of the collapsed cylinder. A cool time of 200 milliseconds was used. The bars were then moved away from the layers. Four hundred milliseconds later, the interdiffusion region was subjected to a force directed towards separating the layers in order to cause the interdiffused region to fail. The testing speed was 200 millimeters/second and the sample width was 30 millimeters. The force, in Newtons, at which the region failed is provided for each sample and at each bar ("seal") temperature tested.

Data for FIG. 1

| | Hot tack measurements in N/30 mm | | | | | | |
|---|---|---|---|---|---|---|---|
| | film nr. | | | | | | |
| Temperature | 2.2 100% EXCEED 2227ED 0% PP | 2.3. 60% EXCEED 2227ED 40% PP | 2.7. 40% EXCEED 2227ED 60% PP | 2.8. 20% EXCEED 2227ED 80% PP | 5 60% EXCEED 1327ED 40% PP | 1 40% EXCEED 1327ED 60% PP | 3 20% EXCEED 1327ED 80% PP |
| 105 | 0.12 | 0.21 | 0.19 | 0.17 | 0.13 | 0.05 | 0.15 |
| 110 | 1.95 | 1.61 | 1.20 | 1.31 | 1.78 | 1.51 | 1.25 |
| 115 | 8.09 | 6.60 | 5.96 | 3.90 | 8.15 | 7.60 | 4.68 |
| 120 | 6.40 | 8.91 | 11.72 | 15.98 | 9.88 | 11.69 | 16.13 |
| 125 | 4.87 | 10.72 | 10.75 | 17.93 | 10.72 | 11.74 | 18.33 |
| 130 | 4.79 | 9.49 | 12.51 | 15.90 | 10.07 | 11.90 | 17.44 |
| 140 | 4.03 | 9.17 | 11.24 | 13.66 | 8.92 | 10.64 | 15.20 |
| 160 | 2.48 | 6.80 | 7.53 | 8.67 | 6.18 | 7.58 | 8.80 |
| 180 | 1.83 | 4.01 | 4.08 | 5.56 | 3.87 | 4.06 | 6.40 |

Data for FIG. 2

| | Seal strength measurements in N/15 mm | | | | | | |
|---|---|---|---|---|---|---|---|
| Temperature | 2.2 100% EXCEED 2227ED 0% PP | 2.3. 60% EXCEED 2227ED 40% PP | 2.7. 40% EXCEED 2227ED 60% PP | 2.8. 20% EXCEED 2227ED 80% PP | 5 60% EXCEED 1327ED 40% PP | 1 40% EXCEED 1327ED 60% PP | 3 20% EXCEED 1327ED 80% PP |
| 110 | 0.44 | 0.34 | 0.24 | 0.27 | 0.39 | 0.29 | 0.23 |
| 115 | 2.80 | 1.91 | 1.13 | 1.59 | 3.40 | 3.81 | 2.99 |
| 120 | 6.74 | 9.36 | 9.85 | 6.73 | 9.61 | 10.63 | 7.20 |
| 125 | 7.09 | 10.32 | 10.45 | 5.66 | 10.33 | 11.22 | 5.91 |
| 130 | 7.89 | 10.37 | 9.53 | 6.27 | 10.52 | 11.31 | 6.14 |
| 140 | 8.14 | 10.23 | 9.32 | 5.89 | 10.22 | 11.39 | 5.63 |
| 160 | 8.64 | 9.40 | 8.93 | 6.38 | 10.63 | 11.31 | 6.85 |
| 180 | 8.37 | 9.24 | 8.99 | 9.22 | 10.64 | 10.48 | 9.87 |
| 200 | | | | | | | 9.56 |

Figure 3:
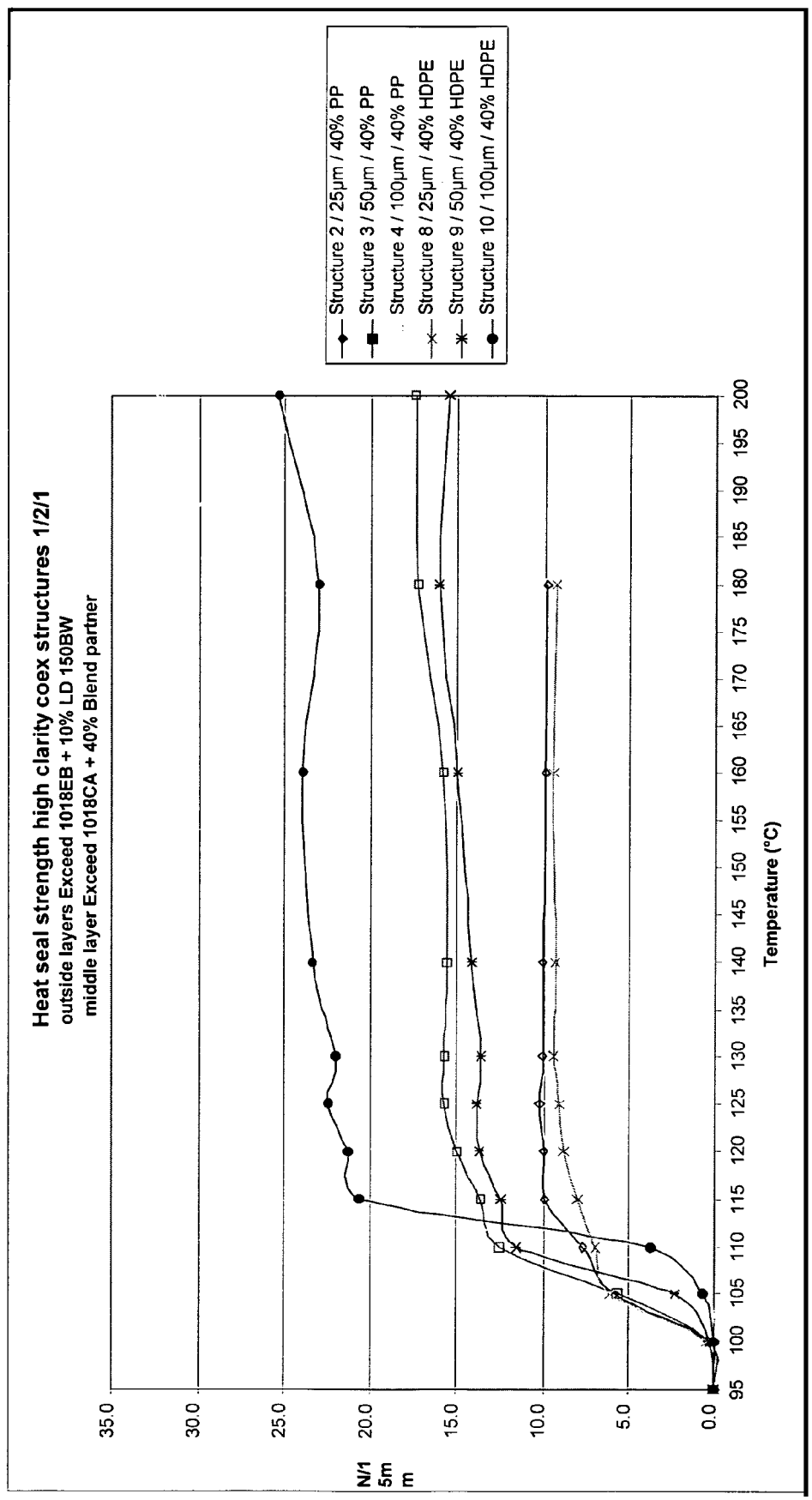
FIG. 3 compares the heat seal strength values of two sets of multi-layer films that have different film thickness and, for comparable thickness, also differ in having either HDPE or PP in the inner layer.

Data for FIG. 3

Middle layer: 60% Exceed 1018CA + 40% PP or HDPE
Outside layers: 90% Exceed 1018EB + 10% LD 150BW
Layer distribution: 1/2/1

| | Seal strength measurements in N/15 mm | | | | | |
|---|---|---|---|---|---|---|
| Temperature (° C.) | Structure 2 40% PP 25 μm | Structure 3 40% PP 50 μm | Structure 4 40% PP 100 μm | Structure 8 40% HDPE 25 μm | Structure 9 40% HDPE 50 μm | Structure 10 40% HDPE 100 μm |
| 95 | 0.00 | 0.00 | 0.00 | 0.00 | 0.00 | 0.00 |
| 100 | 0.34 | 0.24 | 0.19 | 0.41 | 0.25 | 0.00 |
| 105 | 5.9 | 5.7 | 0.5 | 6.1 | 2.3 | 0.6 |
| 110 | 7.6 | 12.5 | 7.2 | 6.9 | 11.5 | 3.7 |
| 115 | 9.9 | | 25.5 | 8.0 | 12.4 | 20.7 |
| 120 | 9.9 | 15.0 | 26.0 | 8.8 | 13.7 | 21.3 |
| 125 | 10.2 | 15.7 | 27.2 | 9.1 | 13.8 | 22.5 |
| 130 | 10.1 | 15.7 | 26.9 | 9.4 | 13.6 | 22.1 |
| 140 | 10.0 | 15.6 | 25.6 | 9.3 | 14.2 | 23.4 |
| 160 | 9.9 | 15.8 | 26.7 | 9.5 | 15.0 | 24.0 |
| 180 | 9.8 | 17.3 | 28.5 | 9.3 | 16.1 | 23.1 |
| 200 | — | 17.5 | 32.2 | — | 15.5 | 25.4 |
| 95 | Peeling | Peeling | Peeling | Peeling | peeling | peeling |
| 100 | Peeling | Peeling | Peeling | Peeling | peeling | peeling |

-continued

| | | | | | |
|---|---|---|---|---|---|
| 105 | Peeling | Peeling | Peeling | Peeling | peeling | peeling |
| 110 | Peeling | Peeling | Peeling | Peeling | peeling | peeling |
| 115 | | Peeling | Peeling | Peeling | peeling | peeling |
| 120 | edge break | Edge break & delamination | Peeling | edge break | edge break | peeling |
| 125 | edge break | Edge break & delamination | Edge break & delamination | edge break | edge break | edge break |
| 130 | edge break | Edge break & delamination | Edge break & delamination | edge break | edge break | edge break |
| 140 | edge break | Edge break & delamination | Delamination | edge break | edge break | edge break |
| 160 | edge break | Edge break & delamination | Delamination | edge break | edge break | edge break |
| 180 | edge break | Edge break & sometimes delamination | Edge break & delamination | edge break | edge break | edge break |
| 200 | edge break | Edge break & sometimes delamination | Edge break & delamination | edge break | edge break | edge break |

Figure 4:
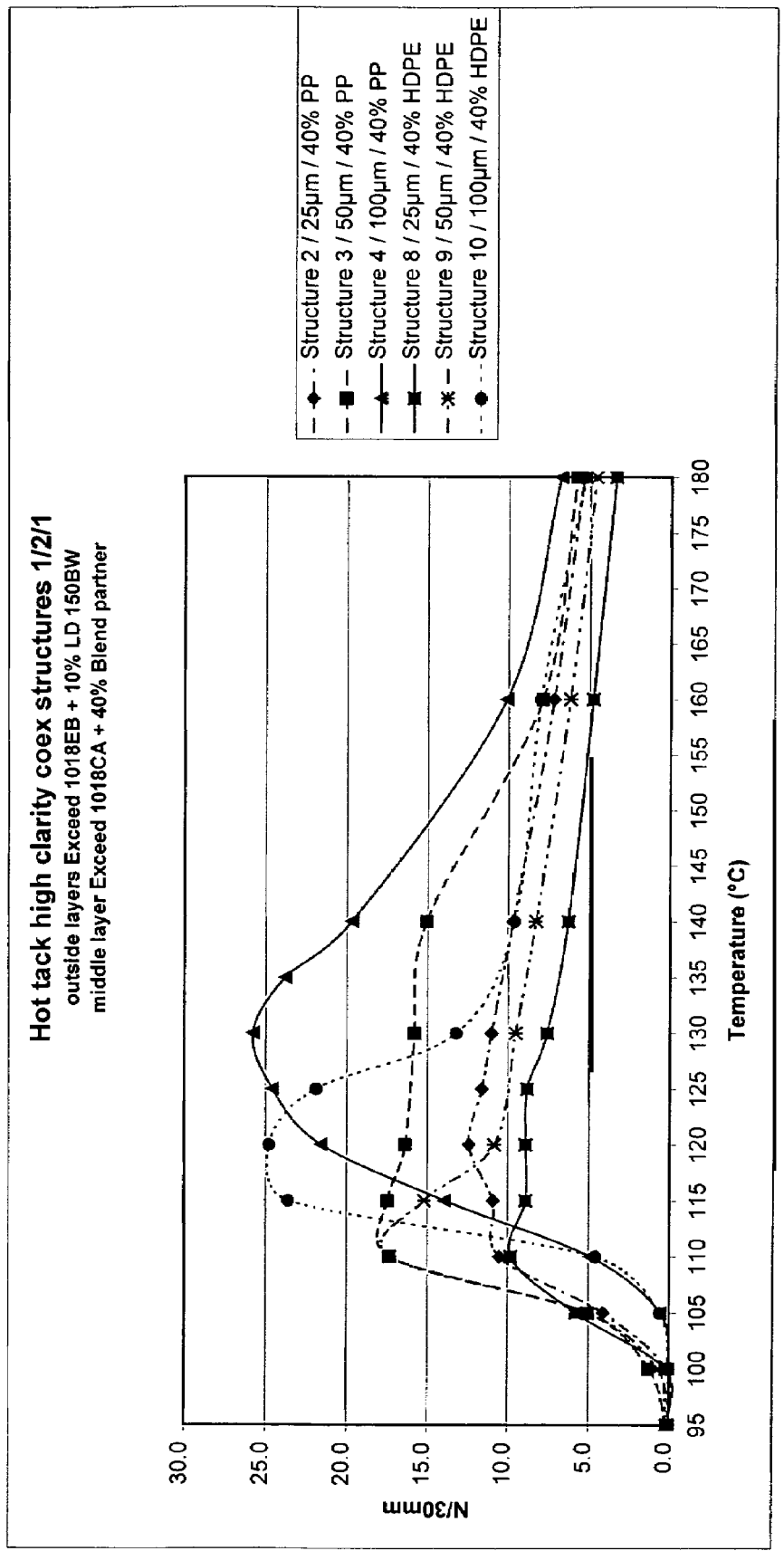
FIG. 4 compares the hot tack values of two sets of multi-layer films that have different film thickness and, for comparable thickness, also differing in having either HDPE or PP in the inner layer.

Data for FIG. 4

Hot tack measurements in N/30 mm

Effect of film thickness + comparison PP with HDPE in middle layer

| | |
|---|---|
| Outside layers: | 90% EXCEED ™ 1018EB + 10% LD 150BW |
| Middle layer: | 60% EXCEED ™ 1018CA + 40% PP4352F1 or HYA800 |
| Outside layers: | 90% EXCEED ™ 1018EB + 10% LD 150BW |
| Layer distribution: | 1/2/1 |

| Temperature (° C.) | Structure 2 40% PP 25 μm | Structure 3 40% PP 50 μm | Structure 4 40% PP 100 μm | Structure 8 40% HDPE 25 μm | Structure 9 40% HDPE 50 μm | Structure 10 40% HDPE 100 μm |
|---|---|---|---|---|---|---|
| 95 | 0.05 | 0.12 | 0.04 | 0.05 | 0.17 | 0.08 |
| 100 | 0.17 | 1.23 | 0.00 | 0.22 | 0.69 | 0.08 |
| 105 | 4.1 | 5.0 | 0.6 | 5.8 | 5.1 | 0.6 |
| 110 | 10.5 | 17.4 | 4.9 | 9.8 | 17.3 | 4.6 |
| 115 | 10.9 | 17.5 | 13.9 | 8.9 | 15.2 | 23.6 |
| 120 | 12.4 | 16.4 | 21.6 | 8.9 | 10.8 | 24.8 |
| 125 | 11.6 | — | 24.6 | 8.8 | — | 21.9 |
| 130 | 11.0 | 15.8 | 25.8 | 7.6 | 9.5 | 13.2 |
| 135 | — | — | 23.8 | — | — | — |
| 140 | 9.7 | 15.1 | 19.7 | 6.3 | 8.3 | 9.6 |
| 160 | 7.2 | 7.9 | 10.1 | 4.8 | 6.2 | 8.0 |
| 180 | 5.4 | 5.8 | 6.8 | 3.4 | 4.6 | 5.3 |

Those skilled in the art will appreciate that numerous modifications to these referred embodiments can be made without departing from the scope of the invention. For example, although the properties of three-layer, multi-layer films using PEs are used to exemplify the attributes of the techniques and materials of the present invention, the disclosed films have numerous other uses and will provide the same properties when other polymers are used in multi-layer films. To the extent that our description is specific, this is solely for the purpose of illustrating preferred embodiments of our invention and should not be taken as limiting our invention to these specific embodiments. The use of subheadings in the description is intended to assist and is not intended to limit the scope of our invention in any way.

We claim:

1. A method of improving hot tack in a multi-layer film, the method comprising:
   selecting a first PE comprising at least one of mPE, LDPE or LLDPE to form a first outer layer;
   selecting a blend comprising from about 95 weight % to about 60 weight % of a mPE and from about 5 weight % to about 40 weight % of a PP to form an inner layer, wherein the weight % is based on the total weight of the mPE and the PP in the blend; and
   selecting a second PE comprising at least one of mPE, LDPE or LLDPE to form a second outer layer; and
   coextruding the first PE, the blend and the second PE to form the multi-layer film comprising the first outer layer, the inner layer and the second outer layer, respectively;
   wherein the inner layer has a component having a final melting point at least about 15° C. higher than a melting point of at least one component of the first outer layer or the second outer layer; and
   wherein the multi-layer film has a maximum hot tack at least about 25% greater than a multi-layer film with 0-weight % of the PP in the inner layer.

2. The method according to claim 1, wherein the multi-layer film has a maximum hot tack from about 25% to about 120% greater than a multi-layer film with 0-weight % of the PP in the inner layer.

3. The method according to claim 1, wherein the inner layer has a final melting point at least about 15° C. higher than a final melting point of at least one component of the first outer layer or the second outer layer.

4. The method according to claim 1, wherein the inner layer has a final melting point at least about 20° C. higher than a final melting point of at least one component of the first outer layer or the second outer layer.

5. The method according to claim 1, wherein the inner layer has a final melting point at least about 25° C. higher than a final melting point of at least one of the components of the first outer layer or the second outer layer.

6. The method according to claim 1, wherein the inner layer has a final melting point at least about 30° C. higher than a final melting point of at least one component of the first outer layer or the second outer layer.

7. The method according to claim 1, wherein the multi-layer film has a hot tack greater than or equal to about 5 N/30 mm between about 117° C. to about 167° C.

8. The method according to claim 1, wherein the multi-layer film has a hot tack greater than or equal to about 9 N/30 mm between about 121° C. to about 139° C.

9. The method according to claim 1, wherein the multi-layer film has a hot tack greater than or equal to about 17 N/30 mm between about 120° C. to about 133° C.

10. The method according to claim 1, wherein a plateau seal strength of the multi-layer film is greater than a plateau seal strength of a similar multi-layer film with 0-weight % PP in the inner layer.

11. The method according to claim 1, wherein the multi-layer film has a seal strength greater than about 7 N/15 mm from about 118° C. to about 165° C.

12. The method according to claim 11, wherein the multi-layer film has a seal strength equal to or greater than about 9 N/15 mm from about 120° C. to about 175° C.

13. The method according to claim 1, wherein the first outer layer, the inner layer and the second outer layer in the multi-layer film have a ratio of from about 1:1:1 to about 1:8:1.

14. The method according to claim 13, wherein the first outer layer, the inner layer and the second outer layer in the multi-layer film have a ratio of about 1:2:1.

15. The method according to claim 1, wherein the first outer layer and the second outer layer are not the same composition.

16. The method according to claim 1, wherein the multi-layer film has a maximum hot tack greater than or equal to about 5 N/30 mm between about 115° C. to about 170° C.

17. The method according to claim 1, wherein the multi-layer film has a maximum hot tack greater than or equal to about 9 N/30 mm between about 115° C. to about 170° C.

18. The method according to claim 1, wherein the multi-layer film has a maximum hot tack greater than or equal to about 17 N/30 mm between about 115° C. to about 170° C.

19. A method of improving hot tack in a multi-layer film, the method comprising:
selecting a first PE comprising at least one of mPE, LDPE or LLDPE to form a first layer;
selecting a blend comprising from about 95 weight % to about 60 weight % of a mPE and from about 5 weight % to about 40 weight % of a PP to form a blend layer, wherein the weight % is based on the total weight of the mPE and the PP in the blend; and
coextruding the first layer and the blend layer to form the multi-layer film;
wherein the blend layer has a component having a final melting point at least about 15° C. higher than a final melting point of at least one component of the sealing layer;
wherein the multi-layer film has a maximum hot tack from about 25% to about 120% greater than a multi-layer film without the PP in the blend layer.

20. The method according to claim 19, wherein the seal strength of the multi-layer film is greater than the seal strength of a similar multi-layer film without PP in the inner layer.

21. The method according to claim 19, wherein the multi-layer film has a seal strength greater than about 7 N/15 mm from about 118° C. to about 165° C.

22. The method according to claim 19, wherein the multi-layer film has a seal strength equal to or greater than about 9 N/15 mm from about 120° C. to about 175° C.

23. The method according to claim 19, wherein the first layer has no PP.

24. A method of improving seal strength in a multi-layer film, the method comprising:
selecting a first PE comprising at least one of mPE, LDPE or LLDPE to form a first outer layer;
selecting a blend comprising from about 95 weight % to about 60 weight % of a mPE and from about 5 weight % to about 40 weight % of a PP to form an inner layer, wherein the weight % is based on the total weight of the mPE and the PP in the blend; and
selecting a second PE comprising at least one of mPE, LDPE or LLDPE to form a second outer layer; and
coextruding the first PE, the blend and the second PE to form the multi-layer film comprising the first outer layer, the inner layer and the second outer layer, respectively;
wherein the inner layer has a component having a final melting point at least about 15° C. higher than a final melting point of at least one component of the first outer layer or the second outer layer;
wherein the multi-layer film has a plateau seal strength at least about 15% greater than a multi-layer film with 0-weight % of the PP in the inner layer.

25. The method according to claim 24, wherein the multi-layer film has a plateau seal strength at least about 20% greater than a multi-layer film with 0-weight % of the PP in the inner layer.

26. The method according to claim 24, wherein the multi-layer film has a seal strength greater than about 7 N/15 mm from about 118° C. to about 165° C.

27. The method according to claim 24, wherein the multi-layer film has a seal strength equal to or greater than about 9 N/15 mm from about 120° C. to about 175° C.

* * * * *